(12) United States Patent
DeMone

(10) Patent No.: US 6,275,883 B1
(45) Date of Patent: Aug. 14, 2001

(54) CONTENTION-FREE SIGNALING SCHEME FOR SHARED CONTROL SIGNALS

(75) Inventor: Paul W. DeMone, Kanata (CA)

(73) Assignee: Advanced Memory International, Inc., San Jose, CA (US)

( * ) Notice: Subject to any disclaimer, the term of this patent is extended or adjusted under 35 U.S.C. 154(b) by 0 days.

(21) Appl. No.: 09/231,730

(22) Filed: Jan. 15, 1999

(51) Int. Cl.[7] ................................................. G06F 13/00
(52) U.S. Cl. ............................................. 710/107; 326/86
(58) Field of Search .......................... 710/107; 713/400, 713/407, 600, 86; 326/114

(56) References Cited

U.S. PATENT DOCUMENTS

| | | | |
|---|---|---|---|
| 4,807,223 | * 2/1989 | Wells | 370/447 |
| 5,153,455 | * 10/1992 | Walters, Jr. | 326/114 |
| 5,404,137 | 4/1995 | Levien . | |
| 5,619,726 | * 4/1997 | Seconi et al. | 710/22 |
| 6,104,210 | * 8/2000 | Stewart | 326/86 |

* cited by examiner

Primary Examiner—Robert Beausoleil
Assistant Examiner—Xuong Chung-Trans
(74) Attorney, Agent, or Firm—Fliesler, Dubb, Meyer & Lovejoy LLP

(57) ABSTRACT

A contention-free transition-based signaling scheme in which a plurality of controlling units and one or more controlled units are connected to a shared bus line, which is also connected to a bus holder cell. Each of the controlling units includes an output circuit that asserts a control signal on the bus line by synchronously asserting a logic level transition on the bus line, and each of the controlled units includes an input circuit that detects assertion of the control signal by detecting that a logic level transition has occurred on the bus line. The synchronous nature of the scheme avoids the possibility of contention because all of the controlling units that intend to assert a logic level transition in a given clock cycle sampled the current logic level at the same time (within the same prior clock cycle). They therefore all agree on the current logic level and will all assert the same opposite logic level when asserting their logic level transition. In addition, detection by the controlled unit input circuits of logic level transitions can be made synchronous as well.

9 Claims, 3 Drawing Sheets

CONTENTION-FREE SIGNALING SCHEME FOR SHARED CONTROL SIGNALS

CROSS REFERENCE TO OTHER APPLICATIONS

The following applications are owned by the assignee of the present application, and their contents are hereby incorporated by reference:

U.S. patent application Ser. No. 09/132,158, filed Aug. 10, 1998, entitled MEMORY SYSTEM HAVING SYNCHRONOUS-LINK DRAM (SLDRAM) DEVICES AND CONTROLLER, inventors Gustavson et. al.;

U.S. Patent Application filed concurrently herewith, entitled VARIABLE LENGTH PIPELINE WITH PARALLEL FUNCTIONAL UNITS, inventors DeMone et. al.

FIELD OF THE INVENTION

The invention relates to the field of high speed data communications, and more particularly, to a transition-based signaling system providing data transfer between multiple controlling elements and multiple controlled elements.

BACKGROUND TO THE INVENTION

For a complex digital system with multiple controlling elements and multiple controlled elements, the number of unique signal paths required for a fully connected graph-type control signal implementation increases dramatically as a function of system complexity. To avoid routing congestion, wasted area for interconnect, and long signal paths, it is desirable to share as many signal paths as possible. For example, in a system with N control units ($C_1$, $C_2$, $C_N$) and M functional units ($F_1$, $F_2$, ... $F_M$) where each functional unit requires W control signals, in order to implement a system with unique control signal paths linking every control unit to every functional unit, W*N*M separate signal paths are required. If the control units share a single set of signal paths to each functional unit, then only W*M signal paths are required. However, in order to share control signals, it is necessary to have an appropriate signaling scheme and protocol in place for reliable and contention-free communication.

There are a number of signaling schemes for shared signals that have been widely used in the past including tri-state (three-state) and wired-or signaling. One problem with conventional tri-state signaling is the need to rescind an asserted control signal to prevent the controlled functional unit from recognizing the asserted control signal multiple times. Returning to the hypothetical system with N control units described earlier, a control unit C, might assert a group of control signals in cycle i, rescind those signals in cycle i+1, and then tri-state the control signals in cycle i+2. A system operating in this manner would therefore require two overhead clock cycles (cycle i+1 and cycle i+2) each time a control unit finishes asserting a control signal. The overhead can be reduced by causing the control signals to be rescinded in the first half of cycle i+1 and tri-stated in the second half of cycle i+1, but this still requires one overhead clock cycle after assertion of the control signal. Either weak pull-up/pull-down resistors or bus holder cells (weak cross-coupled inverters) can be used to hold the control signals in a negated state in the absence of control activity for an extended period of time, but if bus holder cells are used, then it may be necessary to further include an initialization step to rescind all control signals to a known, inactive state when the system is reset.

If either of the above two signaling schemes is used, and there is more than one control unit, there will be contention between the output drivers of the multiple control units attempting to assert the same control signal in consecutive clock cycles. The attempt by say a second control unit to assert control signals would contend with the rescinding of control signals by say a first control unit. This contention problem can be eliminated through the use of wired-or signaling but at the cost of DC power consumption when control signals are asserted, and potentially long periods time are required to passively rescind asserted control signals when negated. Another approach to eliminating the contention problem is to always rescind control signals in the first half of a clock cycle and design the control units to only assert control signals in the second half. This approach has the disadvantage of providing only a short time window to assert potentially long and heavily loaded signal paths. A need therefore arises for a signaling system which avoids contention between multiple control and functional units without increasing DC power consumption, without limiting assertion times for data transfer, and without imposing significant overhead delays.

SUMMARY OF THE INVENTION

It is therefore an object of the present invention to provide a signaling scheme which avoids contention between multiple control and functional units. It is a further object of the invention to implement the above mentioned signaling system without increasing DC power consumption and limiting assertion times for data transfer.

According to the invention, roughly described, a plurality of controlling units and one or more controlled units are connected to a shared bus line, which is also connected to a bus holder cell. Each of the controlling units includes an output circuit that asserts a control signal on the bus line by synchronously asserting a logic level transition on the bus line, and each of the controlled units includes an input circuit that detects assertion of the control signal by detecting that a logic level transition has occurred on the bus line. The synchronous nature of the scheme avoids the possibility of contention because all of the controlling units that intend to assert a logic level transition in a given clock cycle sampled the current logic level at the same time (within the same prior clock cycle). They therefore all agree on the current logic level and will all assert the same opposite logic level when asserting their logic level transition. In addition, detection by the controlled unit input circuits of logic level transitions can be made synchronous as well.

In accordance with an embodiment of the invention, a method for transmitting control data in a transition-based synchronous digital signaling system having at least one controlling unit for receiving commands and outputting control signals and at least one functional unit responsive to the control signals for executing control steps, a method for transmitting control data comprises the steps of: during a first system clock cycle, causing a first logic-level transition on a shared control signal line in response to an asserted command applied to the controlling unit; storing a logic level resulting from the logic-level transition in a control signal state retention cell for the duration of the first clock cycle; during a second clock cycle, causing a second logic-level transition and executing within the functional unit at least one control step carried on the shared control line; sampling the shared control line at the beginning and end of each consecutive system clock cycle for indicating a state transition to the functional unit; whereby the functional unit executes the control step only upon detection of one of the logic-level transitions.

Further in accordance with an embodiment of the invention, a transition-based synchronous digital signaling system comprises at least one controlling unit for receiving a command and outputting a control signal onto a shared control bus; at least one functional unit coupled to the bus responsive to the control signal for executing a control step associated with the asserted command, the functional unit sampling the control bus during each cycle of a system clock; and a state retention cell coupled to the shared control bus for storing state of the control signal; wherein the functional unit executes the control step upon detection of a logic-level transition on the control bus.

BRIEF DESCRIPTION OF THE DRAWINGS

The invention will be described with respect to particular embodiments thereof, and reference will be made to the drawings, in which.

DETAILED DESCRIPTION OF THE INVENTION

Figure 1:
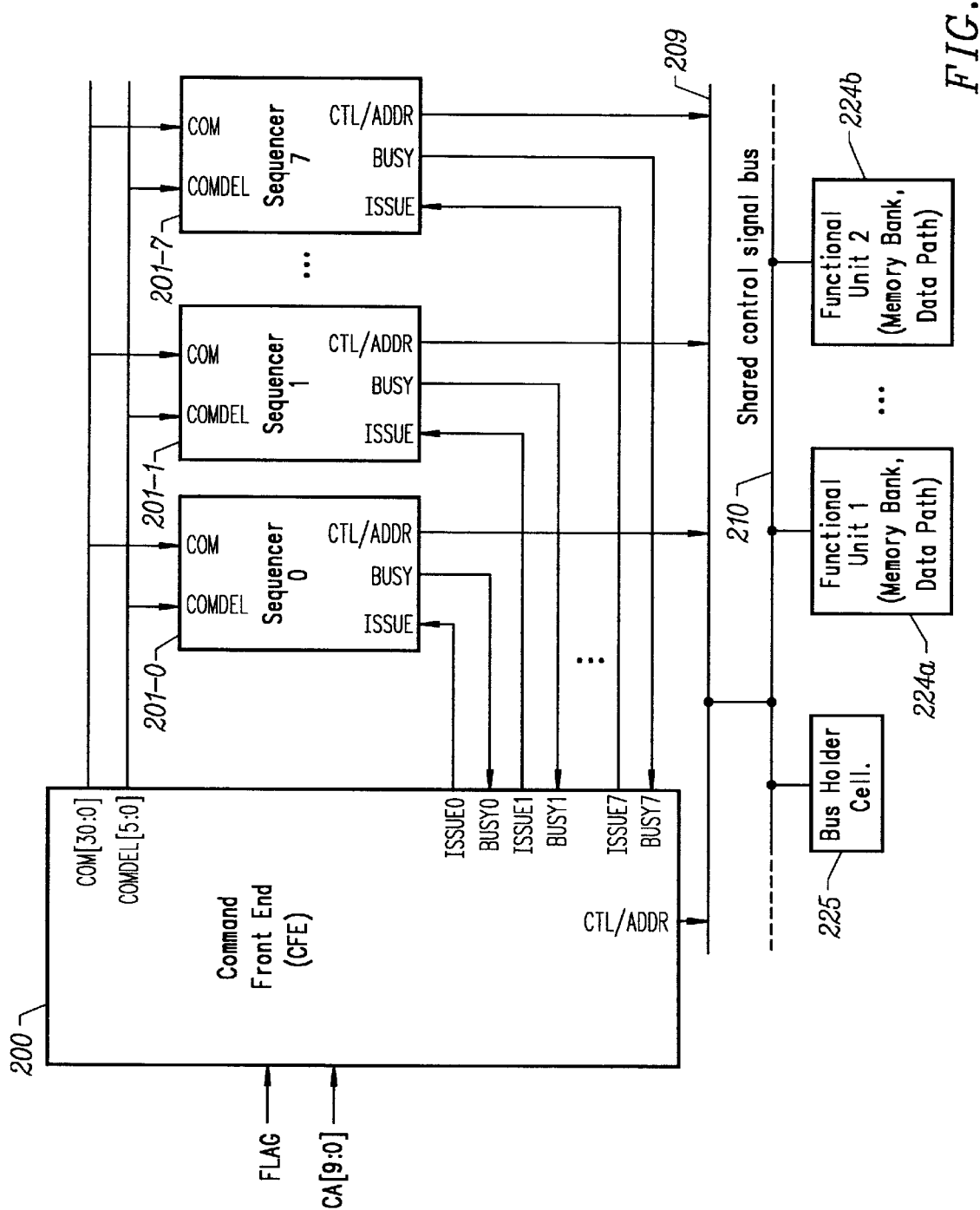
FIG. 1 is a signaling system block diagram incorporating features of the invention.

FIG. 1 illustrates an implementation of the signaling system according to an embodiment of the present invention. The system includes a command decoder front end CFE 200 for receiving external command and address signals from a memory controller or command module (not shown). The CFE 200 decodes the external commands and either issues internal commands for execution by a selected sequencer 201-0, 201-1, or 201-7 (collectively, 201), or executes some of the control steps in a decoded command and then passes over the execution of the rest of the decoded command to a sequencer. In either case, the selected sequencer 201 or the CFE 200 produces, as outputs, internal control and address signals CTL/ADDR for transmitting to one of a plurality of functional units 224a, 224b, . . . (collectively, 224), via bus 209 and bus 210 (bus 209 and bus 210 are physically the same but have been drawn separately to illustrate the plural connections to functional units). Bus 210 represents a multi-bit shared control signal bus. Also coupled onto bus 210 is a bus holder cell 225 (one per bit) for storing a bus state for a clock cycle or more. The CFE 200 and the sequencers 201 can be thought of as controlling units whereas memory banks or data paths coupled to the bus 210 can be thought of as functional units (controlled units), thereby creating the structure of the signaling scheme according to the preferred embodiment of the invention.

Figure 2:
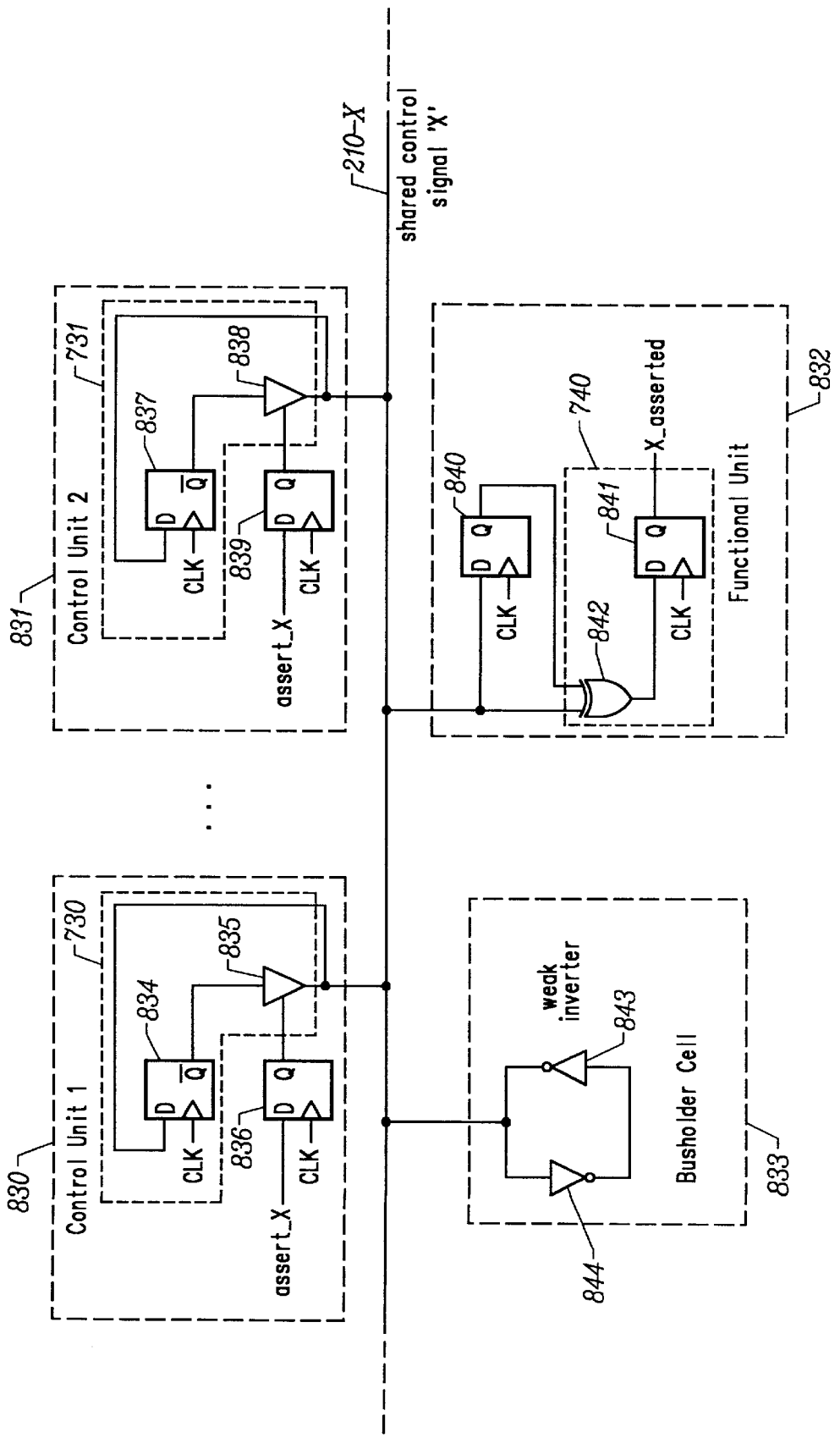
FIG. 2 is a schematic diagram of input and output circuitry and a bus holder cell, in the functional blocks of FIG. 1.

FIG. 2 is a more detailed illustration of the driving and receiving portions of the system in FIG. 1, for a case consisting of two controlling units 830 and 831, a functional unit 832 and a bus holder cell 833. Only one control signal line 210-X is shown in FIG. 2, but it will be understood that assertion of the control signal X could involve assertion of state transitions on multiple signal lines.

In the system of FIG. 1, control units 830 and 831 represent two units from the group consisting of the CFE 200 and the command sequencers 201, any of which can drive the control line 210-X. Functional unit 832 represents any of the functional units 224 in FIG. 1. The bus holder cell 833 could be physically part of any of the control units or functional units, or could be physically a separate cell as shown in FIG. 2. The function of the bus holder cell 833 is described below.

FIG. 2 shows the output driver portion of the control units 830 and 831. Referring to control unit 830, the output driver comprises two D-type flip/flops 836 and 834 as well as a tri-state buffer 835. Flip-flop 836 receives a command "assert-X" at its D-input and the system clock CLK at its clock input and outputs, on its Q output, a control signal to enable the tri-state buffer 835. Flip/flop 834 receives the output of the tri-state buffer 835 at its D-input and CLK on its clock input and outputs its Q\("Q-not") output to the input of the tri-state buffer 835. The resulting output signal from control unit 830 is therefore the output of the tri-state buffer 835. A similar output driver structure exists for control unit 831 as illustrated in FIG. 2.

The flip/flop 834 and the buffer 835 together can be thought of as a current state memory 730, because it samples the current logic level on the shared control signal line 210-X on each clock and stores it until the next clock. Current state memory 730 can equally well be thought of as a "next state memory", because the next logic level which would be driven onto signal line 210-X should one of the controlling units choose to assert the control signal X, is always fully determined by the current logic level (i.e., it will always be the opposite of the current logic level). These principles also apply to current state memory 731 in control unit 831.

A feature of current state memory 730 is that it includes an odd number of polarity reversals in the path from its input to its output. The number of polarity reversals in the embodiment of FIG. 2 is one, which occurs because of the use of the Q\ output of flip/flop 834 rather than the Q output. It will be appreciated, however, that the polarity reversal or reversals could be placed elsewhere in the path in another embodiment. Example placements include an inverter in the path from the signal line 210-X to the D input of flip/flop 834; the substitution of an inverting tri-state buffer for non-inverting buffer 835, and so on. Any odd number of polarity reversals, placed anywhere in the path from the input to the output of the current state memory 730, will suffice. The same principles apply to current state memory 731 in control unit 831.

The bus holder cell 833 consists of two cross-coupled inverters 843 and 844 which essentially act as a shared SRAM (static random access memory) bit storing the most recently asserted value on control signal line 210-X, until overwritten. The output of each inverter is connected to the input of the other, and the output of inverter 843 (input of inverter 844) is connected to the shared signal line 210-X. The inverter 843 is designed with weak driving characteristics so it can be easily overcome with an opposite polarity signal driven onto the shared control line 210-X by one of the control units 830 or 831.

The input portion of functional unit 832 comprises two D-type flip/flops 840 and 841 and an exclusive OR (XOR) gate 842. Shared control signal 210-X is input into one of the inputs of the XOR gate 842 as well as to the D-input of flip/flop 840, which in turn is clocked by the system clock CLK. The Q output of flip/flop 840 is input as the second input to the XOR gate 842, which then outputs to the D-input of flip/flop 841. The XOR gate 842 and the flip/flop 841 together therefore make up a "clocked comparator" 740 having two inputs (the two inputs of XOR gate 842) and an output (the Q output of flip/flop 841). On each clock, the clocked comparator 740 samples the logic levels on its two inputs and indicates on its output whether they are unequal. Many other configurations will be apparent to the reader for implementing a clocked comparator.

The output of clocked comparator 740 represents an "asserted-X" control signal within the functional unit 832, and indicates detection by the functional unit 832 that the control signal X had been asserted. The asserted-X signal is used to implement some control operation in the functional unit 832. Examples of some of such control operations include but are not limited to open column high or low, open row, close row, initiate DPI transfer, and initiate DPI transfer.

Figure 3:
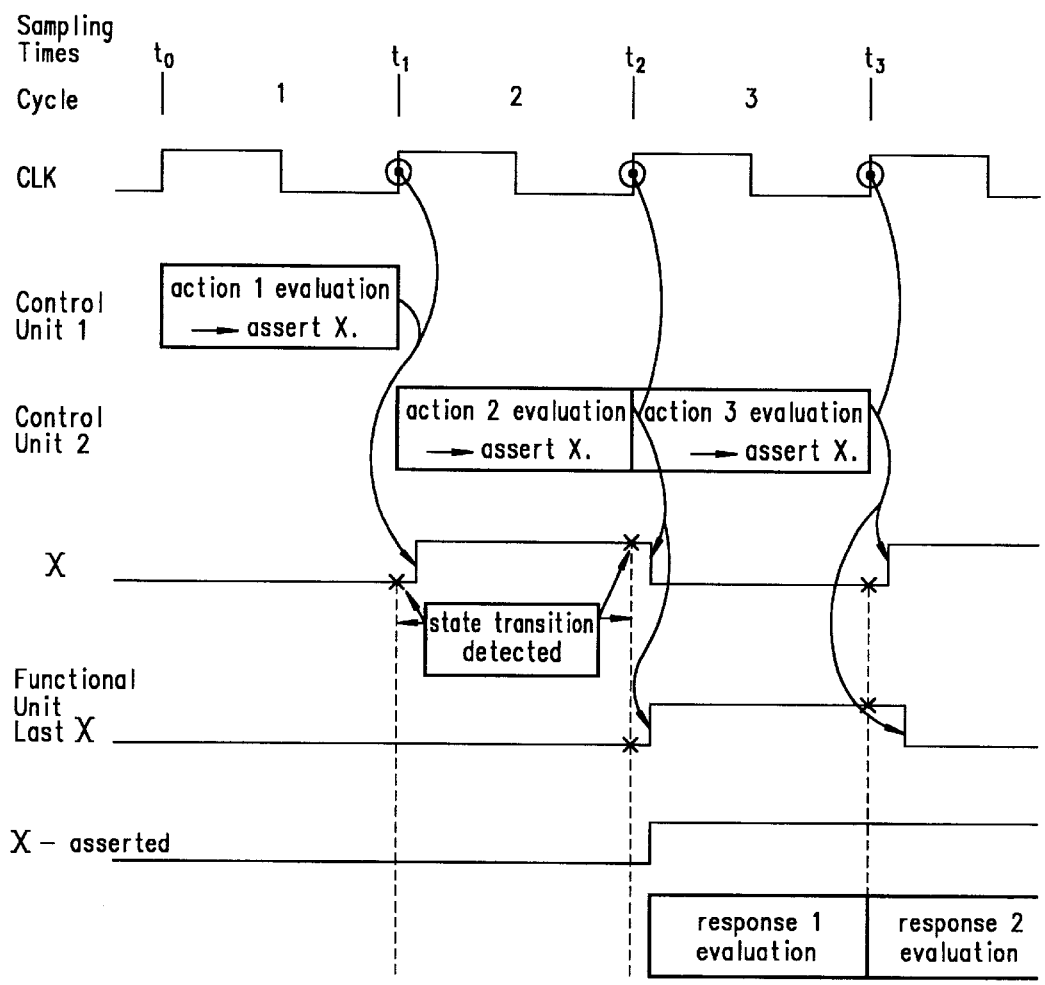
FIG. 3 is a timing diagram illustrating operation of the system in FIGS. 1 and 2.

FIG. 3 is a timing diagram illustrating the operation of the circuits of FIG. 2. Referring to FIG. 3, prior to an arbitrary system clock cycle, cycle 1 for example, initiated at sampling time $t_0$, control unit 830 evaluates a command and decides to assert the corresponding control signal onto the shared control signal line 210-X. Since this is a fully synchronous system, control unit 830 will assert is request and upon the next rising edge of CLK at time $t_1$, and after a short time delay, the control signal 210-X will experience a transition in its logic state from a logic low to a logic high (note that prior to this change, at sampling time $t_1$, the shared control signal 210-X had a logic low value). The state of control signal 210-X is maintained by the bus holder cell 833 for the duration of cycle 1 until it is overwritten in the next cycle. At the end of cycle 1 and the beginning of cycle 2, control unit 831 evaluates a command action and chooses to assert X. At the end of cycle 2, demarcated by sampling time $t_2$, the shared control signal 210-X is still logic high, and therefore a state transition is detected by the functional unit 832. The D-flip/flop 840 stores the last 210-X value (output of 840) and the XOR gate 842 compares the current value of 210-X and last 210-X. Since at $t_2$, 210-X is logic high and last 210-X is logic low, the X-asserted output of D-flip/flop 841 is made logic high by the XOR gate 842 on the rising clock edge. The functional unit 832 then proceeds to execute the control steps associated with the X-asserted control signal (not shown). Subsequently, during a third clock cycle, cycle 3, control unit 831 decides to continue to assert X. At time $t_3$, the functional unit 832 samples the shared signal 210-X and finds it to be logic low, thereby indicating another state transition since sampling time $t_2$. Since the command to continue to assert X was provided during cycle 3, 210-X will again change states after sampling time $t_3$, and the last 210-X in the functional unit D-flip/flop 840 will also change states. However, since both 210-X and last 210-X still remain opposite in phase, the X-asserted output remains logic high, through the XOR action of 842. As can be seen from FIG. 3, three clock cycles are required between the time when an action is evaluated by a controlling unit and the time when an asserted control signal results in the functional unit. However, assertion of the control signal occupies only one clock cycle on the shared bus. No overhead cycles are required for rescinding the control signal or for contention avoidance. Also, from FIG. 3, it can be seen that the two controlling units 830 and 831 did not have to contend for the control signal 210-X bus over consecutive clock cycles, as was the case in the prior art. The system can continue to operate in this fashion with alternating control between control units on every clock cycle.

The embodiment of the invention described above therefore makes use of transition-based tri-state signaling on a shared control signal line 210-X with state retention by bus holder cell 833. More generally, a control unit asserts control signal onto the control signal bus 210-X by sampling a command and driving the complementary value through a tri-state buffer enabled for one clock period. A functional unit detects the assertion of a control signal by comparing the state of the control signal with its state in the previous cycle; the functional unit recognizes the control signal as asserted on the control signal line 210-X only when the signal has a different logic state from one clock cycle to the next rather than simply monitoring the state during that particular clock cycle, as was done in the prior art.

The transition based signaling system described above has at least the following advantages over conventional level-based tri-state signaling:

1. The scheme described herein is contention free since there is no need to rescind control signals between sequential control events. Should two or more control units simultaneously assert an event in parallel, no contention would result because all the control units would be driving the control signal line toward the same logic level—to the opposite of its previous logic level.

2. There is no need for special initialization logic to force control signals into a known state at reset since the signal state is unimportant. Only transitions carry information.

3. The DC power consumed during signaling is relatively low when compared to prior art approaches since the number of state transitions on the control signal line is minimal and there is no DC current consumption during either logic state.

4. The scheme in amenable to high-performance implementations since a control unit can take nearly the entire clock period to drive the control signal line(s) to the opposite state.

5. The scheme is fully static and can run at clock frequencies down to DC and can be clock stepped.

Other Applications

The transition-based signaling implementation described herein can be used in any system which utilizes a bus-like shared communication resource for distributing information. Although it can be used as the basis for interchip control distribution, it is particularly well-suited for on-chip signaling because of its use of bus holder cells rather than pull-up or pull-down resistors, and because of its use of a single signal state transition (rather than two level states) to indicate a control event, thus reducing dynamic power consumption.

The above description is to be taken as illustrative of the invention, not as limiting its scope or spirit. Numerous modifications and variations will become apparent to those skilled in the art after studying the above disclosure.

As used herein, a given signal or event is "responsive" to, or "depends upon", a predecessor signal or event if the predecessor signal or event influenced the given signal or event. If there is an intervening processing element or time period, the given event or signal can still be "responsive" to, or "dependent upon", the predecessor signal or event. If the intervening processing element combines more than one signal or event, the signal output of the processing element is considered "responsive" to, or "dependent upon", each of the signal or event inputs. If the given signal or event is the same as the predecessor signal or event, this is merely a degenerate case in which the given signal or event is still considered to be "responsive" to, or "dependent upon", the predecessor signal or event.

Given the above disclosure of general concepts and specific embodiments, the scope of protections sought is to be defined by the claims appended hereto.

What is claimed is:

1. Shared bus communication apparatus comprising:
   a shared bus line;
   a plurality of controlling units each having an output connected to said bus line; and
   a first controlled unit having an input connected to said bus line,
   wherein each of said controlling units includes an output circuit that samples a current logic level on said bus line synchronously with a clock signal, and in response to a control signal assertion signal asserts a control signal on said bus line by asserting a logic level transition on said bus line synchronously with said clock signal,
   and wherein said controlled unit includes an input circuit that detects assertion of said control signal by detecting that a logic level transition has occurred on said bus line.

2. Apparatus according to claim 1, wherein said controlling units comprise parallel controlling units each capable of controlling said controlled unit in response to a controlling unit selector.

3. Apparatus according to claim 1, comprising a plurality of controlled units including said first controlled unit, each having an input connected to said bus line, and each including an input circuit that detects assertion of said control signal by detecting that a logic level transition has occurred on said bus line.

4. Apparatus according to claim 1, wherein the output circuit in each given one of said controlling units comprises:
   a next state circuit having an enable input, said next state circuit sampling the current logic state on said bus line synchronously with said clock signal and, in dependence upon said enable input, asserting on said bus line the opposite of said sampled current logic state; and
   an output synchronization circuit having a data input coupled to receive said control signal assertion signal from the given controlling unit, said output synchronization circuit providing said control signal assertion signal to the enable input of said next state circuit synchronously with said clock signal.

5. Apparatus according to claim 4, wherein said next state circuit comprises:
   a tri-state buffer having a data input, a data output and an enable input, the data output of said tri-state buffer being connected to said bus line and the enable input of said tri-state buffer being the enable input of said next state circuit; and
   a current state memory having a data input coupled to said bus line and further having a complemented data output connected to the data input of said buffer, said current state memory sampling the current logic state on said bus line synchronously with said clock signal.

6. Apparatus according to claim 4, wherein said output synchronization circuit comprises a D-Flip/flop having a data input coupled to receive said control signal assertion signal, having a data output coupled to the enable input of said next state circuit, and having a clock input coupled to receive said clock signal.

7. Apparatus according to claim 1, wherein the input circuit in said controlled unit comprises:
   a prior state memory coupled to sample the logic state on said bus line synchronously with said clock signal, said prior state memory having an output; and
   a clocked comparator having a first input coupled to said bus line and a second input coupled to the output of said prior state memory, and further having a clock input coupled to receive said clock signal.

8. Apparatus according to claim 1, further comprising:
   a first inverter having an input connected to said bus line and further having an output; and
   a second inverter having an input coupled to the output of said first inverter and further having an output connected to said bus line, said second inverter having driving characteristics which can be overcome by a signal assertion on said bus line.

9. A transition-based synchronous digital signaling system for a memory system comprising:
   a command front-end processor for receiving an assert-command signal and optionally outputting a control signal onto a shared control bus in response thereto;
   a command sequencer coupled to receive commands from said command front-end processor and output a control signal onto said shared control line in response thereto;
   at least one functional unit coupled to said bus responsive to said control signals for executing a control step associated with said asserted command, said functional unit sampling said control bus during each cycle of a system clock;
   a state retention cell coupled to said shared control bus for storing the state of said control bus;
   wherein said functional unit executes said control step upon detection of a logic-level transition on said control bus.

* * * * *